United States Patent [19]

Covey et al.

[11] Patent Number: 5,818,460
[45] Date of Patent: Oct. 6, 1998

[54] METHOD FOR PERFORMING POLYGON SET OPERATIONS ON POLYGONAL REGIONS

[75] Inventors: Robert D. Covey; Ching-Chi Billy Hsu, both of Alameda, Calif.

[73] Assignee: Autodesk, Inc., San Rafael, Calif.

[21] Appl. No.: 855,713

[22] Filed: May 8, 1997

[51] Int. Cl.⁶ .................................................. G06F 15/00
[52] U.S. Cl. ............................................................ 345/443
[58] Field of Search .................................... 345/443, 442, 345/441, 440, 433, 118, 121

[56] References Cited

U.S. PATENT DOCUMENTS 5,438,656  8/1995  Valdés et al. ............................ 395/143

OTHER PUBLICATIONS

Weiler, Kevin, "Polygon Comparison Using a Graph Representation", SIGGRAPH '80 Conference Proceedings, *Computer Graphics*, vol. 14(3), Jul. 1980, pp. 10–18.

You–Dong, Liang et al., "An Analysis and Algorithm for Polygon Clipping", *Communications of the ACM,* vol. 26, No. 11, Nov. 1983, pp. 868–877.

*Primary Examiner*—Phu K. Nguyen
*Attorney, Agent, or Firm*—Gates & Cooper

[57] ABSTRACT

A method, apparatus, and article of manufacture for performing a polygon set operation on two or more polygons. A trace direction is determined based on the polygonal set operation, and an initial intersection point between first and second polygons is selected. The perimeter of either the first or second polygons is traced beginning from the selected intersection point and continuing in the determined trace direction. The trace switches between the perimeters of the first and second polygons as additional intersection points are reached during the tracing. The tracing is terminated when the selected intersection point is encountered by the tracing step. These steps are then repeated until all intersection points between the first and second polygons have been encountered.

15 Claims, 8 Drawing Sheets

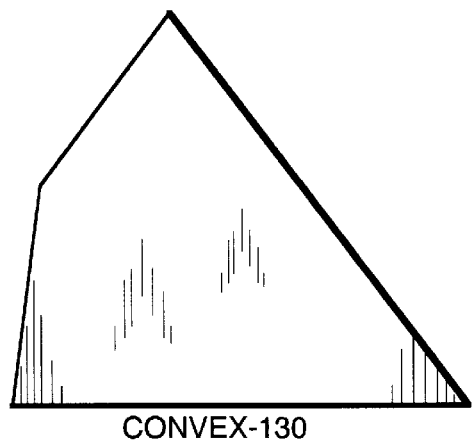
CONVEX-130
FIG. 2A.
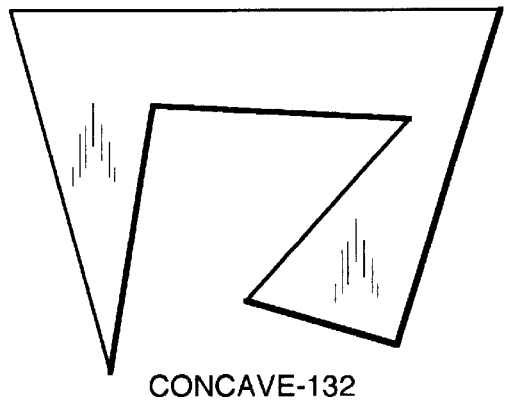
CONCAVE-132
FIG. 2B.
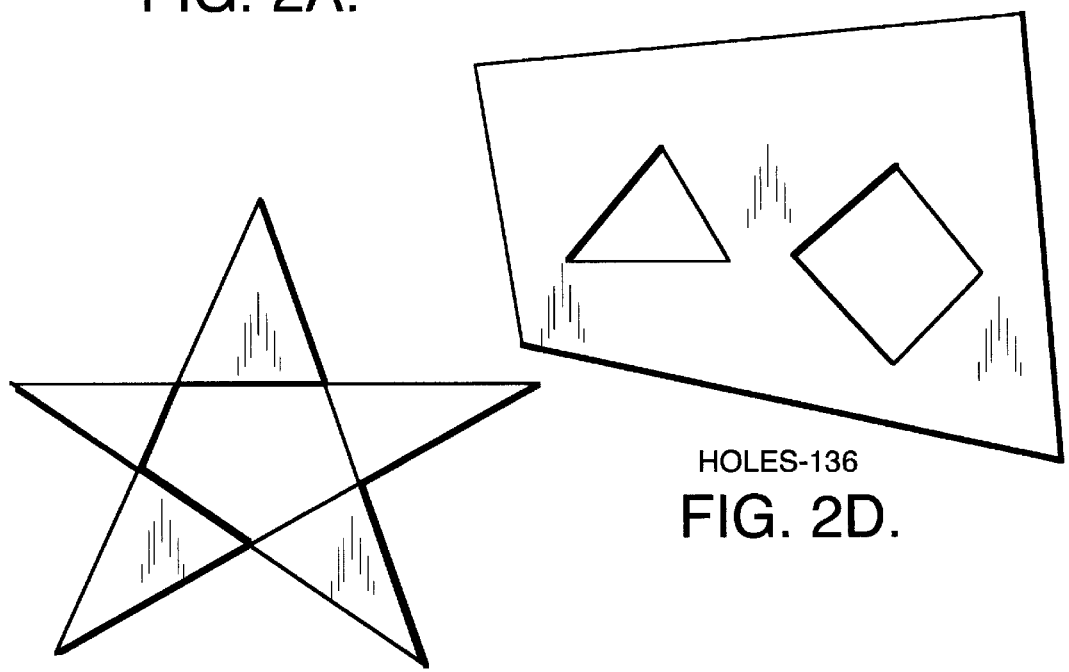
HOLES-136
FIG. 2D.
SELF-INTERSECTING-134
FIG. 2C.
FIG. 2E.
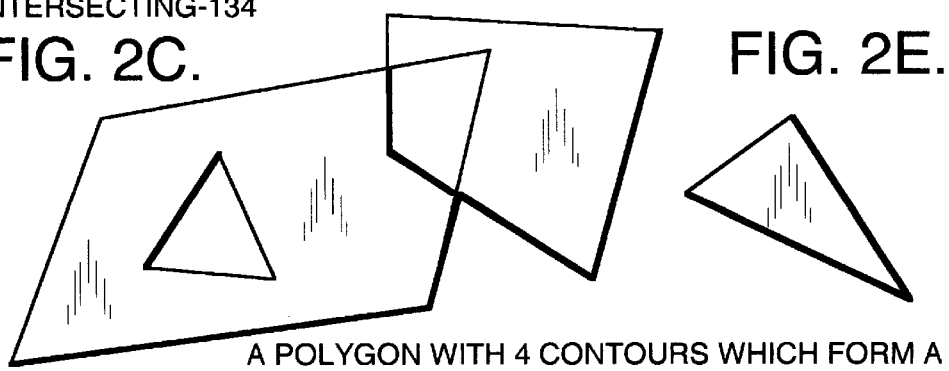
A POLYGON WITH 4 CONTOURS WHICH FORM A HOLE, A SEPARATE REGION, AND AN OVERLAPPING REGION.-138

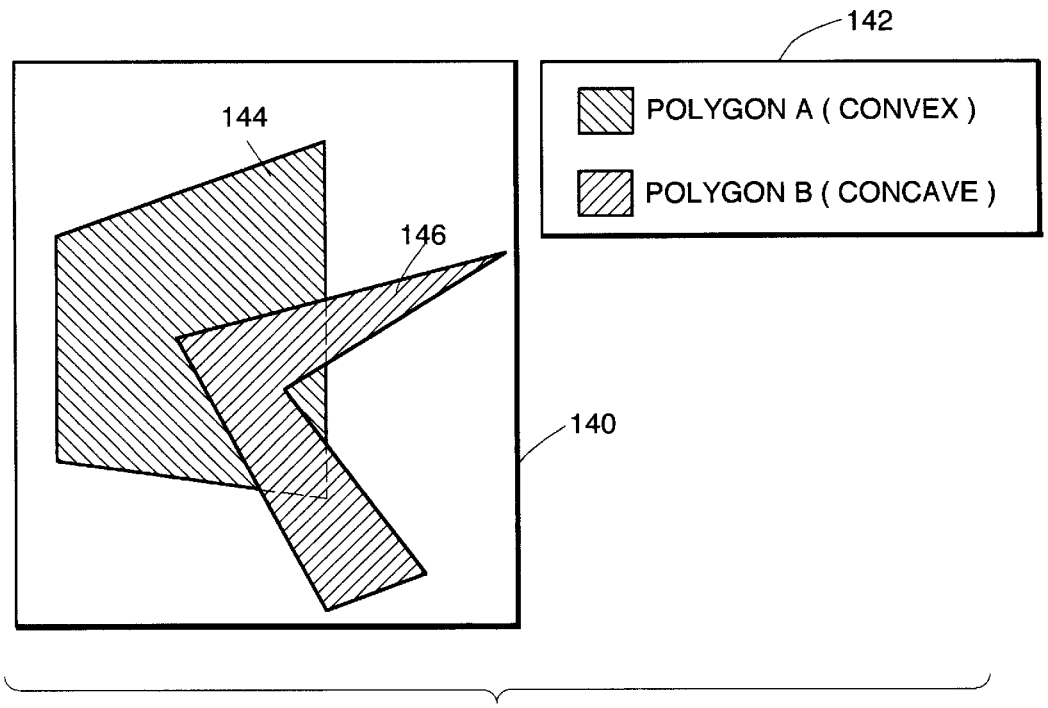
FIG. 3A.
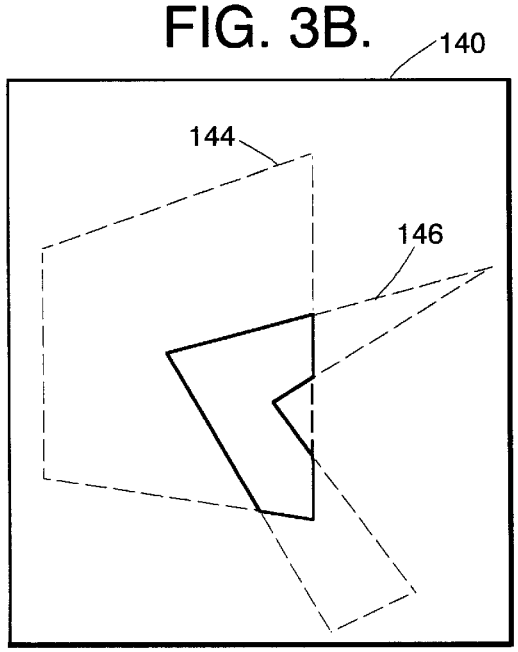
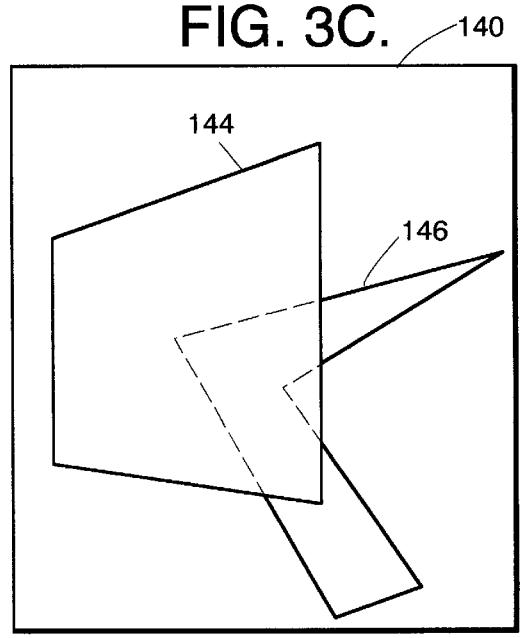

FIG. 6.

| POLYGON SET OPERATION | TRAVERSING POLYGON A | TRAVERSING POLYGON B |
|---|---|---|
| A ∩ B | INSIDE B | INSIDE A |
| A ∪ B | OUTSIDE B | OUTSIDE A |
| A − B | OUTSIDE B | INSIDE A |
| B − A | INSIDE B | OUTSIDE A |

METHOD FOR PERFORMING POLYGON SET OPERATIONS ON POLYGONAL REGIONS

BACKGROUND OF THE INVENTION

1. Field of the Invention

This invention relates generally to a computer graphics system, and more particularly, to a method for determining the results of polygon set operations between two or more polygonal regions.

2. Description of Related Art

In the field of computer graphics, polygon comparison is defined as the process where input polygons are compared and output polygons are generated. These output polygons may result from polygon set operations such as the union, intersection, or difference between two or more polygons. Researchers have performed work on methods for graphically displaying polygon set operations, as reflected by the following publications:

Weiler, K, "Polygon Comparison Using a Graph Representation", *Computer Graphics,* vol 14(3), 1980 [Weiler]; and Liang, Y- D, et al., "An Analysis and Algorithm for Polygon Clipping", *Communications of the ACM,* vol 26(11), 1983 [Liang].

These methods require complex data structures. For example, [Weiler] requires a total of ten pointers, including pointers for a two by two array of vertices, an array of four inside and outside edges, and an array of two contours.

In [Liang], the display of output polygonal regions includes regions with degenerate edges. Specifically, when an output region should consist of two separate and unconnected regions, the [Liang] method connects the two regions by inserting a dangling edge between them.

Thus, there is a need in the art for a method of polygon comparison that allows for simpler data structures and eliminates undesirable degenerate edges.

SUMMARY OF THE INVENTION

To overcome the limitations in the prior art described above, and to overcome other limitations that will become apparent upon reading and understanding the present specification, the present invention discloses a method, apparatus, and article of manufacture for performing a polygon set operation on two or more polygons. A trace direction is determined based on the polygonal set operation, and all intersection points between the first and second polygons are calculated. The polygons consist of one or more contours, where a contour is defined as a single closed loop boundary that encloses an area. An initial intersection point between the first contour of the first polygon and second contour of the second polygon is selected. The perimeter of either the first or second polygon is traced beginning from the selected intersection point and continuing in the determined trace direction. The trace switches between the perimeters of the first and second contours as additional intersection points are reached during the tracing. The tracing is terminated when the selected intersection point is encountered by the tracing step. These steps are then repeated until all intersection points between the first and second polygons have been encountered. The remaining contours are traced based on the polygon set operation.

BRIEF DESCRIPTION OF THE DRAWINGS

Referring now to the drawings in which like reference numbers represent corresponding parts throughout:

FIG. 2 is a block diagram that illustrates an example of the information displayed by the computer programs on the monitor according to the present invention;

FIG. 6 is a block diagram that illustrates the polygon set operations performed by the computer programs according to the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides enhancements to computer-assisted drafting (CAD) software. More specifically, the present invention provides enhancements to drafting, drawing or graphics software that graphically represent polygonal regions. Given polygonal regions, the present invention determines the region or regions that represent the intersection, difference, or union of the regions. The polygons that represent the regions may be convex, concave, or self-intersecting, and may contain holes. The present invention traces the edges that form the original polygons, switching between them as points where they intersect are discovered. The present invention determines the direction to trace by the desired operation. This approach allows for simpler data structures while eliminating undesirable degenerate edges produced by other techniques. Notably, this approach provides approximately a 50% smaller data structure than the [Weiler] method discussed above.

Hardware Environment

Figure 1:
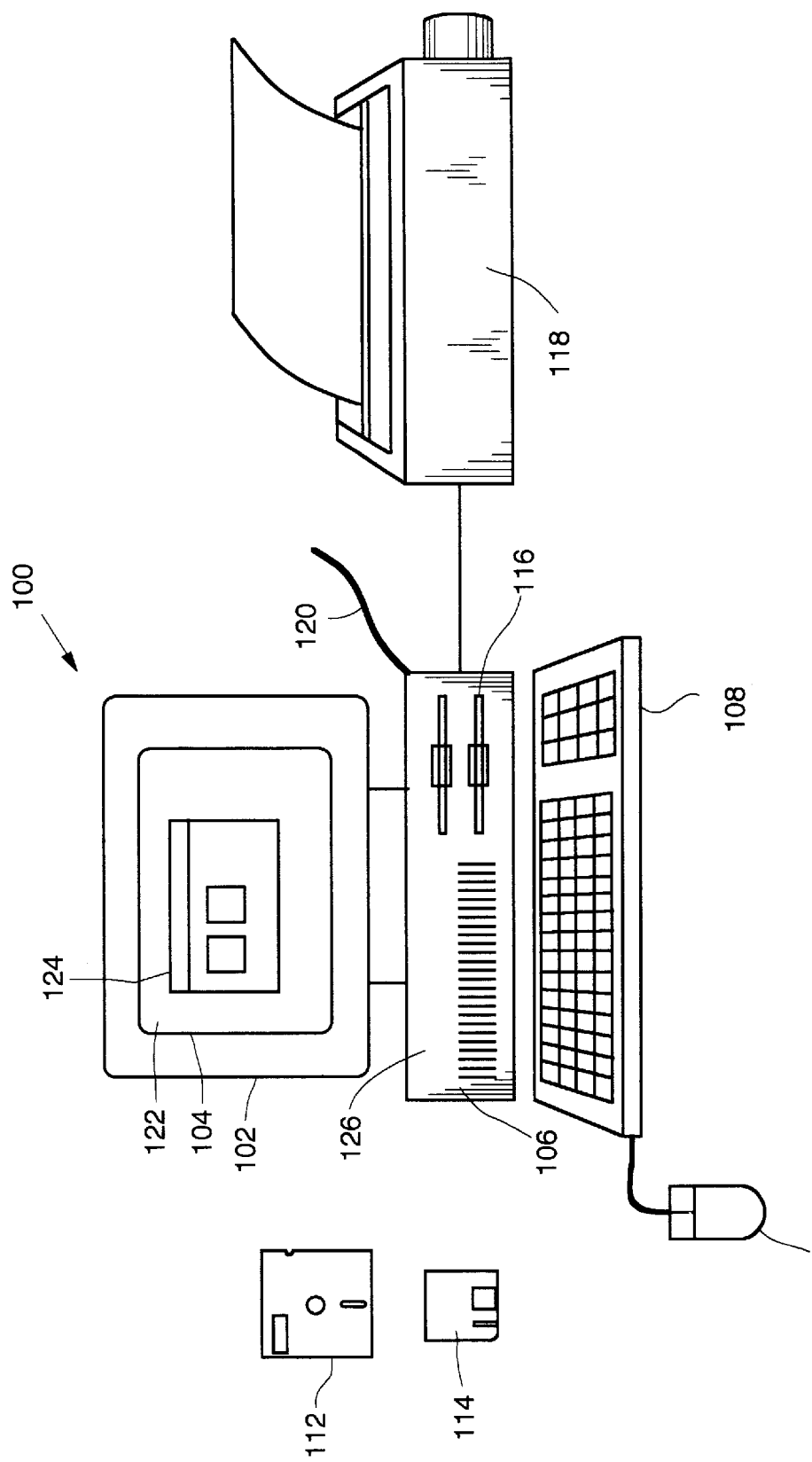
FIG. 1 illustrates an exemplary hardware environment that could be used with the present invention.

FIG. 1 illustrates an exemplary hardware environment 100 that could be used with the present invention. The exemplary hardware environment 100 comprises a computer 106 coupled to I/O devices comprising a monitor 102, a keyboard 108, a mouse device 110, and a printer 118. The computer 106 could also be coupled to other I/O devices, including a local area network (LAN) or wide area network (WAN) via interface cable 120.

The computer 106 comprises a processor and a memory including random access memory (RAM), read only memory (ROM), and/or other components. The computer 106 operates under control of an operating system 122 stored in the memory to present data to the user on the monitor 104 and to accept and process commands from the user via keyboard 108 and mouse device 110.

The present invention is preferably implemented in one or more computer programs or applications, which are depicted as windows 124 presented on the display 104. The computer programs 124 execute under the control of the operating system 122 and generally comprise computer-assisted drafting (CAD) programs, drawing programs, or graphics programs. Generally, the operating system 122 and the computer programs 124 are tangibly embodied in a computer-readable medium, e.g. one or more of removable data storage devices 112, 114, such as a zip or floppy disc drive, or fixed data storage devices 126, including for example, a hard drive, CD-ROM drive, or tape drive.

Those skilled in the art will recognize that the exemplary hardware environment 100 illustrated in FIG. 1 is not intended to limit the present invention. Indeed, those skilled in the art will recognize that other alternative hardware environments may be used without departing from the scope of the present invention.

Example Polygons and Polygon Set Operations

FIG. 2 is a block diagram that illustrates an example of the information displayed by the computer programs 124 on the monitor 104 according to the present invention. In this example, a number of different types of polygonal regions are displayed on the monitor 104 by the computer programs 124, wherein a polygonal region is a closed figure bounded by straight lines. The region may be convex 130, concave 132 or self-intersecting 134 and it may contain holes 136. A region may also be a polygon with four contours 138 which form a hole, a separate region, and an overlapping region.

Another important element in a polygon is a contour which is defined as a single closed loop of straight edges. These edges may cross each other, create holes or define unconnected regions. A polygon, therefore, consists of one or more contours.

FIGS. 3A–3E are block diagrams that illustrate examples of the functions performed by the computer programs 124 on the polygonal regions displayed on the monitor 104 according to the present invention. These functions comprise polygon set operations that can be performed on two polygonal regions.

Figure 3D:
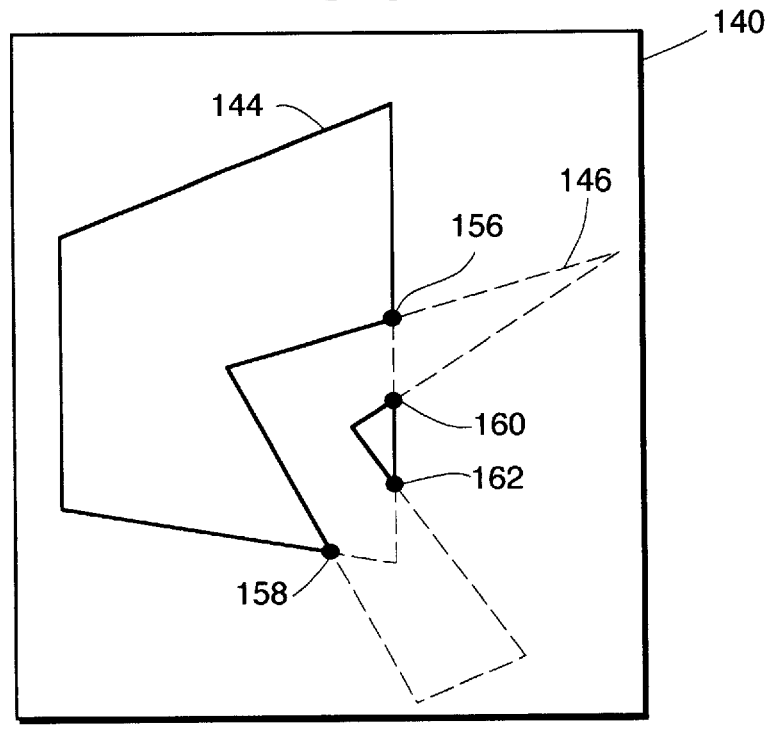
FIGS. 3–3E are block diagrams that illustrate examples of the functions performed by the computer programs on the polygonal regions displayed on the monitor according to the present invention.

FIG. 3A displays two polygonal regions 140 and FIGS. 3B–3E illustrate the polygon set operations (intersection, union, and difference). In FIG. 3A, the legend 142 shows that polygon A 144 is a convex polygon and polygon B 146 is a concave polygon.

FIG. 3B represents the intersection operation (also known as clipping) of polygon A 144 and polygon B 146. In FIG. 3B, both polygon A 144 and polygon B 146 are input into the present invention. The solid outline represents the output polygon generated by the intersection operation.

FIG. 3C represents the union of polygon A 144 and polygon B 146. The solid outline represents the output polygon created by the union operation.

Figure 3E:
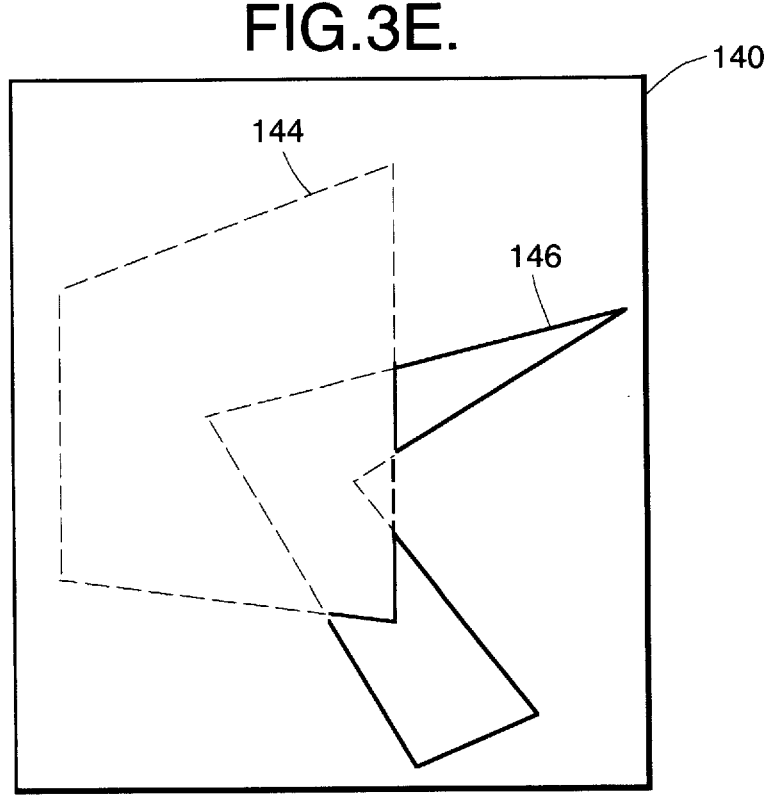

FIGS. 3D and 3E represent the difference of polygon A 144 and polygon B 146. The solid outline represents the output produced by the difference operation. In this case, the difference is represented in FIG. 3D as (A–B) and in FIG. 3E the difference is represented as (B–A).

Figure 4:
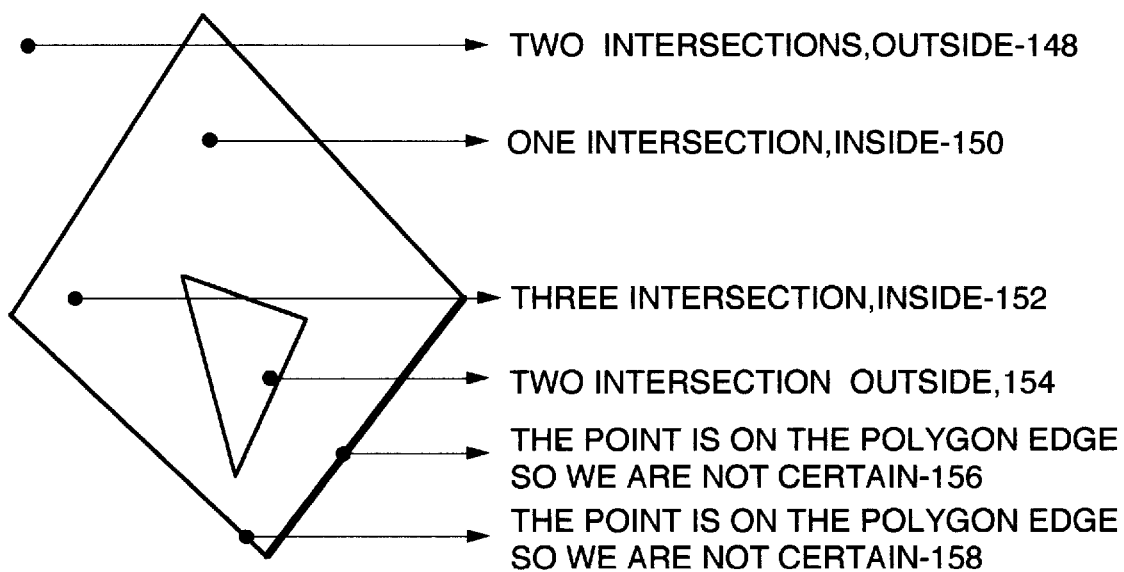
FIG. 4 illustrates how the present invention determines if a point is inside or outside of a polygon.

FIG. 4 illustrates how the present invention determines if a point is inside or outside of a polygon. In particular, the present invention uses the even-odd rule to determine if a point is inside or outside of a polygon. The even-odd rule consists of four steps:
1. The present invention selects a point on a polygonal region.
2. The present invention shoots an infinite ray to one direction. FIG. 4 displays horizontal rays in the right direction. The ray could have been shot in the left direction or it could have been a vertical ray.
3. The present invention intersects the ray with the polygon and all of its contours.
4. If there are an even number of intersections, the point is outside, otherwise it is inside.

The even-odd rule does not give a precise answer when the selected point is located on a polygon edge. To avoid being on a polygon edge, the present invention selects a point on a polygon that is a midpoint between an intersection (of the ray and the polygon) and its next neighbor.

FIG. 4 shows examples of the even-odd rule. In the first Two Intersections, outside case 148, an infinite ray is directed in the right direction and intersects the polygons in two places. Since two is an even number, the point is outside of the polygon. In the One Intersection, inside case 150, the ray intersects the polygon in one place. Because the number of intersections is odd, the point is inside the polygon. Likewise, for the Three Intersection, inside case 152, the number of intersections is odd and the point is inside the polygon. A second Two Intersection, outside case 154 shows an infinite ray intersecting both a hole within the polygon and the edge of the polygon. As discussed above the two intersections define a point that is outside of the polygon. The two edge cases, 156 and 158, do not create intersections with the polygons. Therefore, it is not clear whether the points are inside or outside of the polygon.

Flowcharts

Figure 5A:
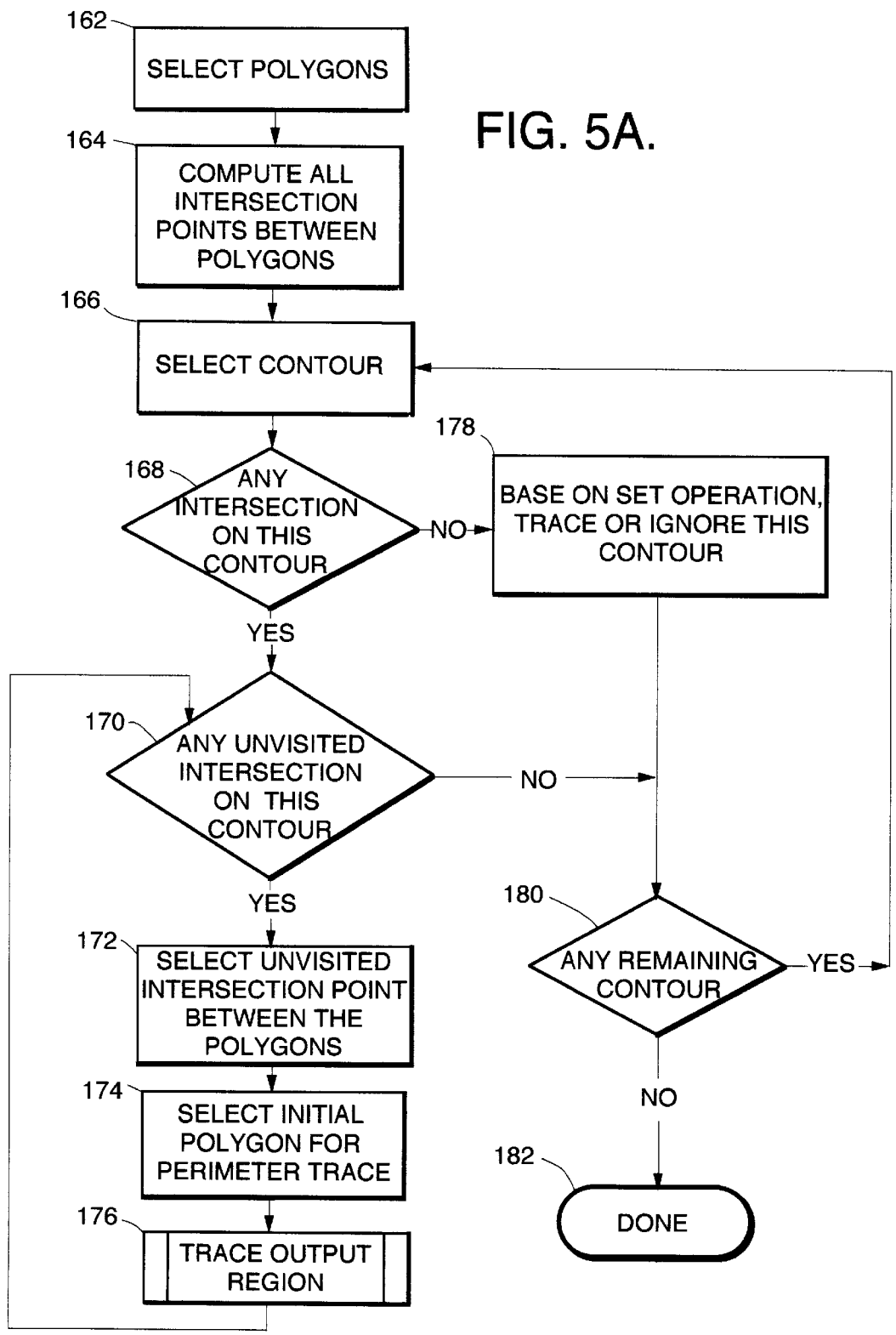
FIGS. 5A–5B are flowcharts that illustrate the logic performed by the computer programs according to the present invention.
Figure 5B:
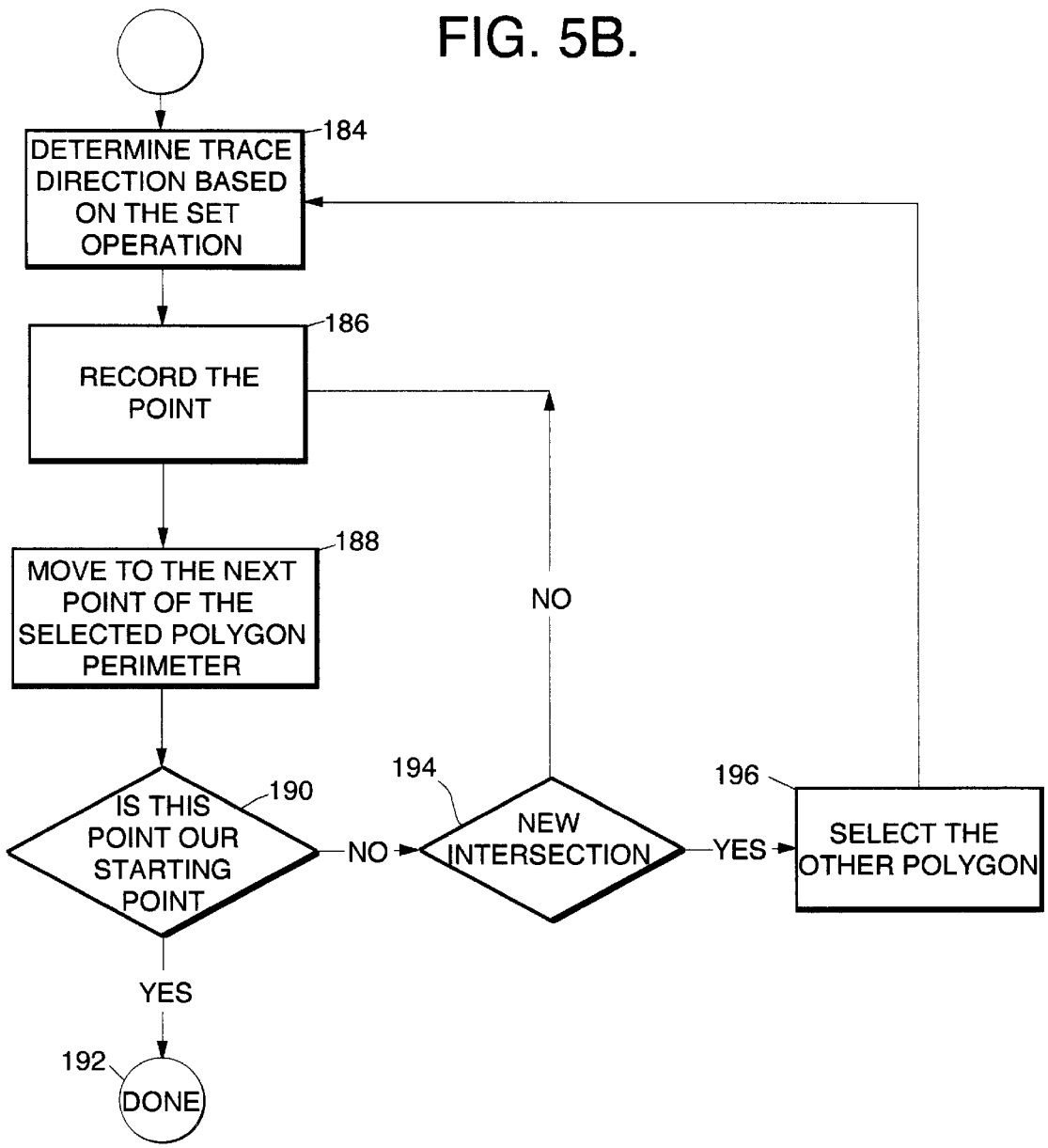

FIGS. 5A–5B are flowcharts that illustrates the logic performed by the computer programs 124 according to the present invention.

Polygon Set Operation Flowchart

In FIG. 5A, Block 162 represents the computer 106 selecting at least two polygons on which to perform the following operations. These selections can be made manually in response to user inputs or automatically by the computer itself.

Block 164 represents the computer 106 computing all intersection points between the two polygons. This selection can be made manually in response to user inputs or automatically by the computer 106 itself.

Block 166 represents the computer 106 selecting a contour. This selection can be made manually in response to user inputs or automatically by the computer 106 itself.

Block 168 is a decision block that represents the computer 106 determining whether any intersection points are on the selected contour. If so, control transfers to Block 170; otherwise, if no intersection points exist, control transfers to Block 178.

Intersection Points on the Contour

Block 170 is a decision block that represents the computer 106 determining whether any intersection points have been unvisited. If so, control transfers to Block 172; otherwise, if no unvisited intersection points exist, control transfers to Block 180.

Block 172 represents the computer 106 selecting the unvisited intersection point between the selected polygons.

Block 174 represents the computer 106 selecting the initial polygon for perimeter trace.

Block 176 represents the computer 106 displaying the trace output region and returning control to Block 170.

If no unvisited intersection points exist on the selected contour the computer 106 transfers control from Block 170 to Block 180.

Block 180 is a decision block representing the computer 106 determining whether any remaining contours exist. If so, control transfers to Block 182 and the graphical representation of the polygon set operation is achieved; otherwise, if no remaining contours, control transfers to Block 166.

No Intersection Points on the Contour

If no intersection points exist on the selected contour, computer 106 transfers control from Block 168 to Block 178.

Block 178 represents the computer 106 tracing or ignoring the selected contour based on the polygon set operation.

Block 180 is a decision block that represents the computer 106 determining whether any remaining contours exist. If so, control transfers to Block 182 and the graphical representation of the polygon set operation is achieved; otherwise, if no remaining contours, control transfers to Block 166.

Trace Output Flowchart

FIG. 5B is a flowchart that illustrates the logic performed by the computer when tracing an output polygon.

Block 184 represents the computer 106 determining the trace direction based on the set operation.

Block 186 represents the computer 106 storing the starting trace point.

Block 188 represents the computer 106 moving to the next trace point of the selected polygon.

Block 190 is a decision block that represents the computer 106 determining whether the next trace point is the starting trace point. If so, control transfers to Block 192; otherwise, if the next trace point is not the starting trace point, control transfers to Block 194.

Block 194 is a decision block that represents the computer 106 determining whether their is a new intersection. If so, control transfers to Block 196; otherwise, if no new intersection point exists, control transfers back to Block 186.

Block 196 represents the computer 106 selecting the other polygon and returning control back to Block 184.

An example of the trace output region is illustrated in FIG. 3D. The computer 106 performs the (A–B) difference operation on polygon A 144 and polygon B 146. For the (A–B) difference operation, the intersection points are represented by blackened circle1 156, blackened circle2 158, blackened circle3 160, and blackened circle4 162. The computer 106 can select any one of the four intersection points to begin the trace with. In this example, the computer 106 selects blackened circle1 156 as the initial intersection point. The computer 106 then traces the perimeter of polygon A 144 and switches to polygon B 146 when it reaches blackened circle2 158. The computer 106 traces polygon B 146 until reaching the initial intersection point, represented as blackened circlet 156.

Two intersection points, represented by blackened circle3 160 and blackened circle4 162, have not been reached by the computer 106. The computer 106 can select any one of the two intersection points to begin the second trace with. In this example, the computer 106 selects blackened circle3 160 as the initial intersection point. The computer 106 then traces the perimeter of polygon A 144 and switches to polygon B 146 when it reaches blackened circle4 162. The computer 106 traces polygon B 146 until reaching the initial intersection point, represented by blackened circle3 160. At this point, the polygon set operation has been performed because the computer 106 has reached all four intersection points.

Polygon Set Operation Table

FIG. 6 is a block diagram comprising a table that illustrates the polygon set operations performed by the computer programs 124 according to the present invention. The first column indicates the polygon set operations: intersection (A∩B), union (A∪B), and difference (A–B or B–A). The second and third columns specify how the present invention should perform the perimeter tracing.

For example, in the case of an intersection operation 198, when traversing polygon A 144, the traversal is done inside of polygon B 146. When traversing polygon B 146, the traversal is done inside of polygon A 144. On the other hand, in the case of a union operation 200, the traversals are done outside of both polygons.

The method for evaluating the difference operation, depends upon whether the polygon set operation is a (A–B) difference operation 202 or a (B–A) difference operation 204. For a (A–B) difference operation 202, when traversing polygon A 144, the traversal is done outside of polygon B 146. When traversing polygon B 146, the traversal is done inside of polygon A 144. For a (B–A) difference operation 204, when traversing polygon A 144, the traversal is done inside of polygon B 146. When traversing polygon B 146, the traversal is done outside of polygon A 144.

Conclusion

This concludes the description of the preferred embodiment of the invention. The present invention discloses a method, apparatus, and article of manufacture for performing polygon set operations on two or more polygons.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A computerized method for performing a polygon set operation on two or more polygons, comprising the steps of:
   (a) determining a trace direction based on the polygonal set operation;
   (b) computing all intersection points between polygons, wherein the polygons are comprised of at least one contour, said contour being a single closed loop boundary which encloses an area;
   (c) selecting an initial intersection point between the first contour of the first polygon and the second contour of the second polygon;
   (d) tracing a perimeter of either the first or second contour beginning from the selected intersection point and continuing in the determined trace direction;
   (e) switching between the perimeters of the first and second polygons as additional intersection points are reached during the tracing step (d);
   (f) terminating the tracing step (d) and the switching step (e) when the selected intersection point is encountered by the tracing step (d);
   (g) repeating steps (d)–(g) until all intersection points between the first and second polygons have been encountered; and
   (h) tracing remaining contours based on polygon set operation.

2. The method of claim 1 above, wherein the switching step (d) comprises the step of consecutively tracing the perimeters of the first and a second polygons.

3. The method of claim 1 above, wherein the polygon set operation is selected from a group comprising a union operation, an intersection operation, and a difference operation.

4. The method of claim 1 above, wherein the polygons are selected from a group comprising a convex polygon, a concave polygon, or a self-intersecting polygon.

5. The method of claim 1 above, wherein either of the polygons is comprised of one or more holes.

6. An apparatus for performing a polygon set operation on two or more polygons, comprising:

(a) a computer;

(b) means, performed by the computer, for:

(1) determining a trace direction based on the polygonal set operation;

(2) computing all intersection points between polygons, wherein the polygons are comprised of at least one contour, said contour being a single closed loop boundary which encloses an area;

(3) selecting an initial intersection point between the first contour of the first polygon and the second contour of the second polygon;

(4) tracing a perimeter of either the first or second contour beginning from the selected intersection point and continuing in the determined trace direction;

(5) switching between the perimeters of the first and second polygons as additional intersection points are reached during the tracing step (4);

(6) terminating the tracing step (4) and the switching step (5) when the selected intersection point is encountered by the tracing step (4);

(7) repeating steps (4)–(7) until all intersection points between the first and second polygons have been encountered; and (8) tracing remaining contours based on polygon set operation.

7. An article of manufacture comprising a program storage medium readable by a computer, the medium tangibly embodying one or more programs of instructions executable by the computer to perform method steps for performing a polygon set operation on two or more polygons, the method comprising the steps of:

(a) determining a trace direction based on the polygonal set operation;

(b) computing all intersection points between polygons, wherein the polygons are comprised of at least one contour, said contour being a single closed loop boundary which encloses an area;

(c) selecting an initial intersection point between the first contour of the first polygon and the second contour of the second polygon;

(d) tracing a perimeter of either the first or second contour beginning from the selected intersection point and continuing in the determined trace direction;

(e) switching between the perimeters of the first and second polygons as additional intersection points are reached during the tracing step (d);

(i) terminating the tracing step (d) and the switching step (e) when the selected intersection point is encountered by the tracing step (d);

(g) repeating steps (d)–(g) until all intersection points between the first and second polygons have been encountered; and (h) tracing remaining contours based on polygon set operation.

8. The apparatus of claim 6 above, wherein the polygon set operation is selected from a group comprising a union operation, an intersection operation, and a difference operation.

9. The apparatus of claim 6 above, wherein the polygons are selected from a group comprising a convex polygon, a concave polygon, or a self-intersecting polygon.

10. The apparatus of claim 6 above, wherein either of the polygons is comprised of one or more holes.

11. The apparatus of claim 6 above, wherein the means for switching (5) comprises means for consecutively tracing the perimeters of the first and a second polygons.

12. The article of claim 7 above, wherein the step of switching (e) comprises the step of consecutively tracing the perimeters of the first and a second polygons.

13. The article of claim 7 above, wherein the polygon set operation is selected from a group comprising a union operation, an intersection operation, and a difference operation.

14. The article of claim 7 above, wherein the polygons are selected from a group comprising a convex polygon, a concave polygon, or a self-intersecting polygon.

15. The article of claim 7 above, wherein either of the polygons is comprised of one or more holes.

* * * * *